United States Patent
Ito et al.

(10) Patent No.: US 7,292,396 B2
(45) Date of Patent: Nov. 6, 2007

(54) LENS DEVICE, IMAGE PICKUP DEVICE AND OPTICAL DEVICE

(75) Inventors: Yoshihiro Ito, Saitama (JP); Yoji Naka, Saitama (JP); Mitsuo Manabe, Saitama (JP)

(73) Assignees: FUJIFILM Corporation, Tokyo (JP); Fujinon Corporation, Saitama (JP)

( * ) Notice: Subject to any disclaimer, the term of this patent is extended or adjusted under 35 U.S.C. 154(b) by 120 days.

(21) Appl. No.: 11/230,730

(22) Filed: Sep. 21, 2005

(65) Prior Publication Data

US 2006/0061891 A1  Mar. 23, 2006

(30) Foreign Application Priority Data

Sep. 21, 2004 (JP) ............... 2004-272950
Feb. 25, 2005 (JP) ............... 2005-051505

(51) Int. Cl.
*G02B 15/14* (2006.01)
*G02B 7/02* (2006.01)

(52) U.S. Cl. ....................... 359/703; 359/824

(58) Field of Classification Search ............... 359/703, 359/704, 824
See application file for complete search history.

(56) References Cited

U.S. PATENT DOCUMENTS 4,416,513 A * 11/1983 Uesugi ................. 359/824

| | | | |
|---|---|---|---|
| 4,596,449 A | 6/1986 | Iwata et al. | |
| 4,605,286 A | 8/1986 | Sumi | |
| 5,052,781 A * | 10/1991 | Iizuka ................. | 359/823 |
| 6,744,156 B2 | 6/2004 | Doi | |
| 6,800,970 B2 | 10/2004 | Aoshima | |

FOREIGN PATENT DOCUMENTS

JP   56-147132 A   11/1981
JP   62-195615 A    8/1987

* cited by examiner

*Primary Examiner*—Jordan Schwartz
*Assistant Examiner*—James C Jones
(74) *Attorney, Agent, or Firm*—Sughrue Mion, PLLC (57) ABSTRACT

A first lens holder is connected with a rotary barrel through a helicoid mechanism, and moves in an optical axial direction when the rotary barrel rotates. A second lens holder is connected with the rotary barrel through a cam mechanism. The cam mechanism is constituted of a cam portion that is disposed on a front end surface of the rotary barrel and cam followers that are disposed on a rear end surface of the second lens holder. The cam portion is formed to have sloped surfaces inclined along a circumferential direction and these sloped surfaces are in contact with the cam followers. When the rotary barrel rotates, the cam followers shift in the optical axial direction along the sloped surfaces, thereby moving the second lens holder back and forth in the optical axial direction.

6 Claims, 10 Drawing Sheets

FORWARD DIRECTION ←

BACKWARD DIRECTION →

FIG. 10

LENS DEVICE, IMAGE PICKUP DEVICE AND OPTICAL DEVICE

BACKGROUND OF THE INVENTION

1. Field of the Invention

The present invention relates to a lens device, which moves a lens in an optical axial direction, and an image pickup device and an optical device incorporating the lens device.

2. Description Related to the Prior Art

In recent years, digital cameras have become smaller in size. Along with this trend, lens devices incorporated in the digital cameras also have become miniaturized. Those digital cameras incorporated in compact electronic devices, such as cellular phones or PDA (Personal Digital Assistant), are especially made so small that their lenses are formed to have a diameter of a few millimeters. For those lens devices, pan focus (fixed focus) lenses are mainly used. However, those lens devices are required to have an auto focus function or a zooming function.

The lens device having the zooming function is constituted of, for instance, a zoom lens system consisting of front and rear lens groups, a first lens holder for holding the front lens group, a second lens holder, which is located behind the first lens holder, for holding the rear lens group, and a mount for housing these first and second lens holders movably, and is driven by a stepping motor. U.S. Pat. No. 6,744,156 discloses such stepping motor. The stepping motor comprises a stator for creating a magnetic field and a rotor, which is provided rotatably inside the stator. The stepping motor rotates the rotor in accordance with a driving pulse. Then rotation power of the rotor is transmitted to the first and second lens holders through a gear wheel, thereby performing the zooming of the zoom lens system.

It is also proposed to use a hollow-shaft stepping motor, which has a lens holder incorporated inside the rotor. In this case, a rotary barrel is mounted inside the rotor, and the rotor and the lens holder are connected through a helicoid mechanism. For this configuration, the lens device is driven without using the gear wheel.

However, the conventional devices have a problem being large in dimension since two stepping motors are used for driving the first and second lens holders individually.

SUMMARY OF THE INVENTION

A primary object of the present invention is to provide a compact lens device.

Another object of the present invention is to miniaturize an image pickup device and an optical device.

In order to achieve the above and other objects, a lens device of the present invention comprises a motor, a rotary barrel, a first lens holder, a first interconnection mechanism, a second lens holder and a second interconnection mechanism. The motor has a stator for creating a magnetic field according to energization and a hollow rotor disposed inside the stator and rotates in the magnetic field created by the stator. The rotary barrel is fixed on an inner periphery of the rotor. The first lens holder holds a first lens. The first interconnection mechanism connects the first lens holder and the rotary barrel to move the first lens holder along an optical axis in cooperation with rotation of the rotary barrel. The second lens holder, which is located at an object-side from the first lens holder, holds a second lens. The second interconnection mechanism connects the second lens holder and the rotary barrel to move the second lens holder along the optical axis in cooperation with rotation of the rotary barrel.

The first interconnection mechanism comprises a helicoid formed on an inner periphery of the rotary barrel and a helicoid formed on an outer periphery of the first lens holder being engaged with each other.

The second interconnection mechanism comprises a helicoid formed on an outer periphery of the rotary barrel and a helicoid formed on an inner periphery of the second lens holder being engaged with each other.

It is possible that the second interconnection mechanism is constituted of a cam mechanism comprising a cam portion having a sloped surface inclined along a rotational direction of the rotary barrel and a cam follower contacting with the sloped surface of the cam portion. Either of the second lens holder or the rotary barrel is provided with the cam portion and the other is provided with the cam follower. The second lens holder can be moved according to shifting of a contact position between the sloped surface of the cam portion and the cam follower in cooperation with rotation of the rotary barrel.

It is preferable that either of the cam portion or the cam follower is disposed on an image-side end surface of the second lens holder and the other is disposed on an object-side end surface of the rotary barrel.

It is possible that the cam portion is provided on an outer periphery of the rotary barrel, whereas the cam follower is provided on the image-side end surface of the second lens holder.

Furthermore, it is preferable that the motor is a stepping motor.

An image pickup device of the present invention comprises the above-mentioned lens device and an image sensor for picking up an object image formed by the lens device.

Furthermore, it is possible to constitute an optical device with such lens device.

According to the present invention, it is possible to move both of the first and second lens holders by rotating one rotary barrel, because the first lens holder is connected with the rotary barrel through the first interconnection mechanism, while the second lens holder is also connected with the rotary barrel though the second interconnection mechanism. For this configuration, the lens device can be made small as compared to the conventional lens devices that have two motors.

In addition, it is also possible to form the lens device to have a small external size because the second interconnection mechanism is constituted of the cam mechanism comprising the cam portion having the sloped surfaces inclined along the rotational direction of the rotary barrel and the cam followers contacting with the sloped surfaces of the cam portion, and the cam portion and the cam followers of this cam mechanism are disposed between the end surfaces of the second lens holder and the rotary barrel respectively in such positions to oppose each other.

Furthermore, it is possible to miniaturize the image pickup device and the optical device with using such compact lens device.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
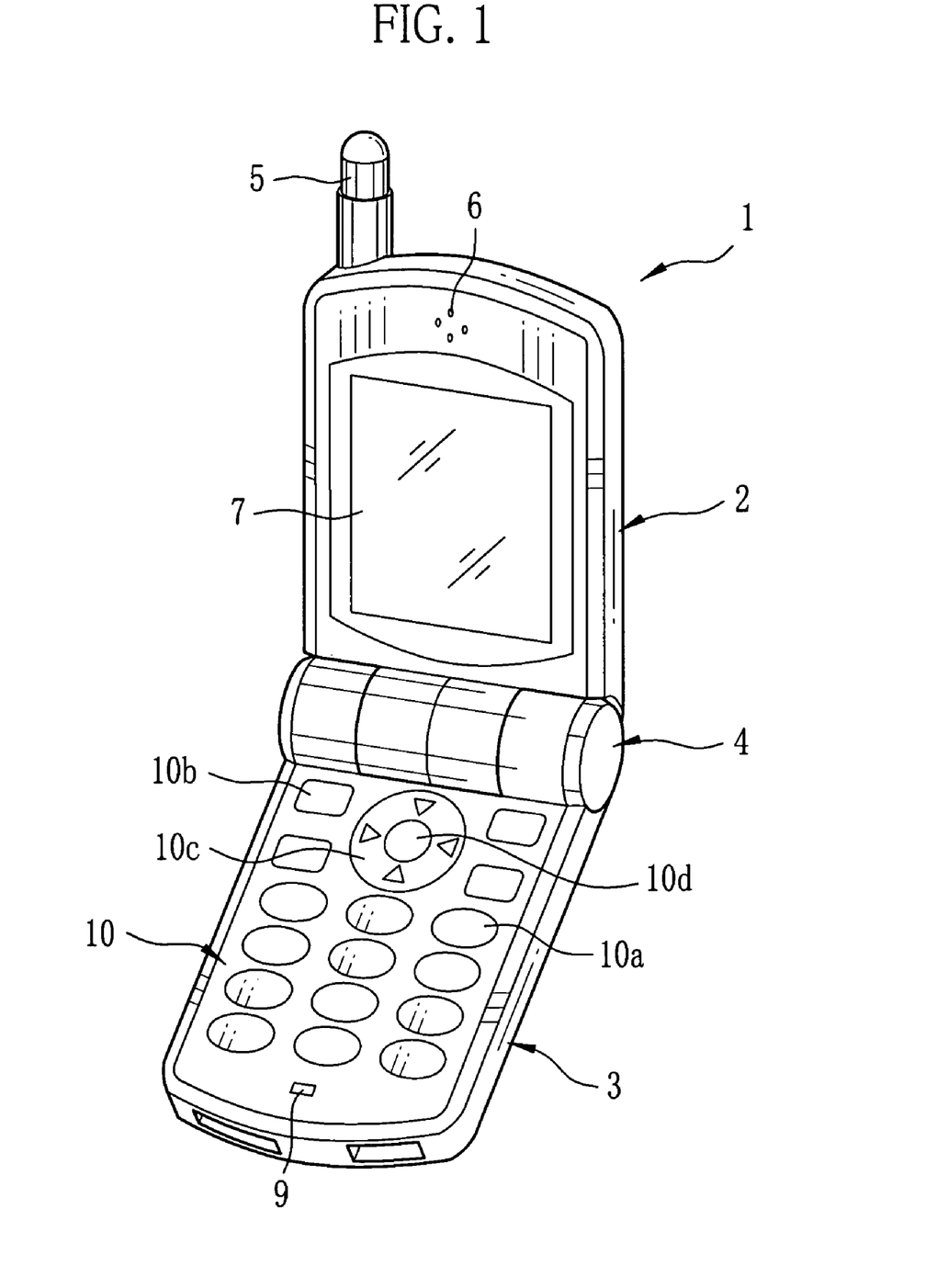
FIG. 1 is a perspective view illustrating a front side of a cellular phone.
Figure 2:
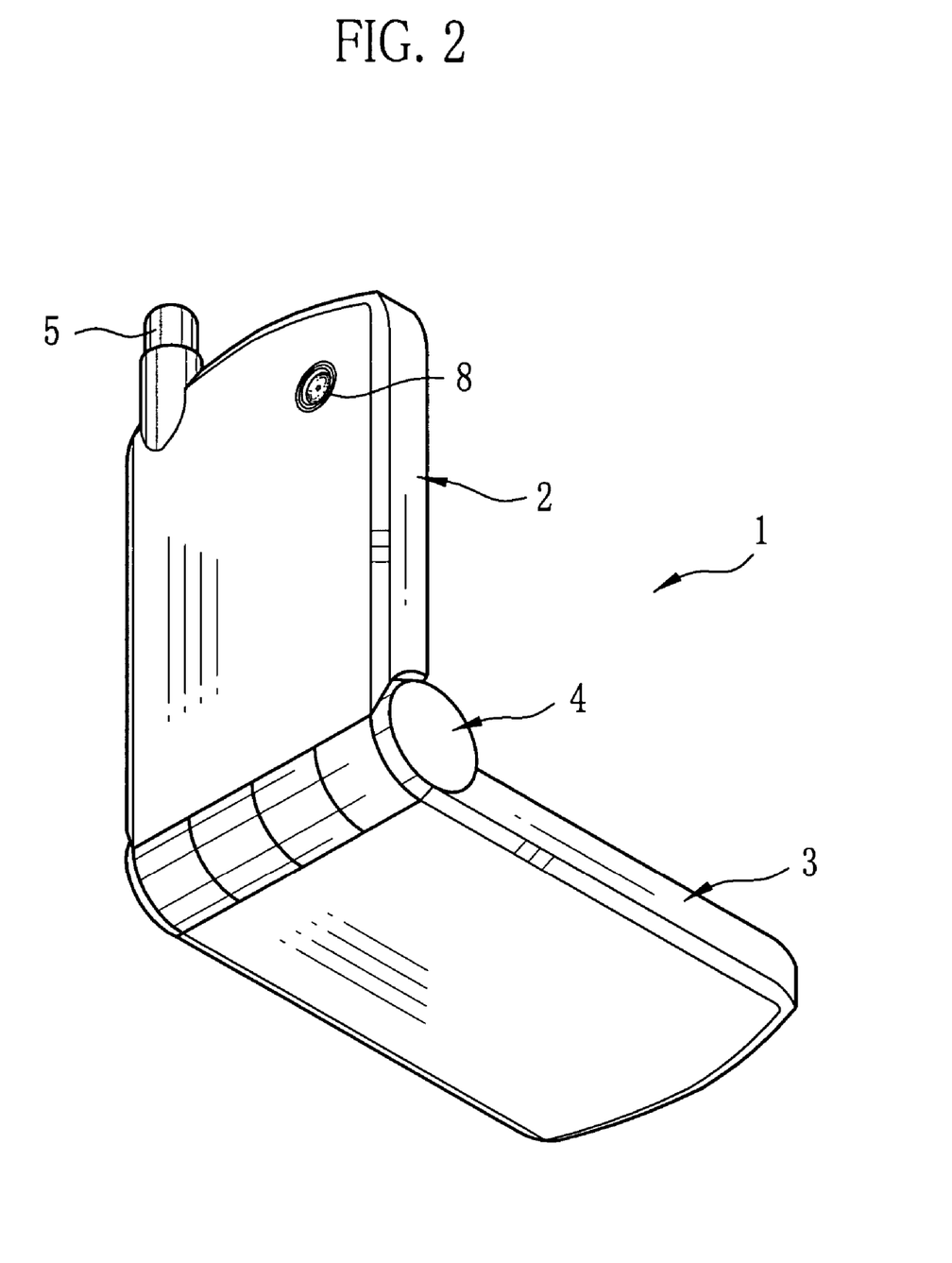
FIG. 2 is a perspective view illustrating a rear side of the cellular phone.

As shown in FIGS. 1 and 2, a cellular phone 1 of the present invention is constituted of a receiver unit 2, a transmitter unit 3 and a hinge portion 4. The receiver unit 2 and the transmitter unit 3 are formed into substantially rectangle thin plate form, and being connected by the hinge portion 4 in a manner pivotally movable thereabout. An antenna 5, which transmits and receives a radio signal, is disposed on a top face of the receiver unit 2. A speaker 6, which outputs voices of a person communicating with a user, ring tones and other sounds, and a LCD 7, which displays telephone numbers, images and the like, are disposed on an inside surface of the receiver unit 2.

A lens device 8, which constitutes an image pickup device 50 (see FIG. 8), is disposed on an outside surface of the receiver unit 2. A zoom lens system is incorporated in the lens device 8, and the image pickup device 50 picks up an object image with a CCD image sensor (image pickup unit) 26, which is disposed behind the zoom lens system (see FIGS. 4, 7 and 8). The cellular phone 1 picks up the object image with the image pickup device 50 by selecting still image pickup mode.

A microphone 9, which converts the voices of the user into a digital voice signal and transmits it to the person communicating with the user through the antenna 5, and a key panel 10 comprising a dial key 10a, a menu key 10b, a selection key 10c and an enter key 10d are disposed on an inside surface of the receiver unit 3. The selection key 10c is used for zooming and the enter key 10d is used for shutter-releasing while the still image pickup mode is selected.

Figure 3:
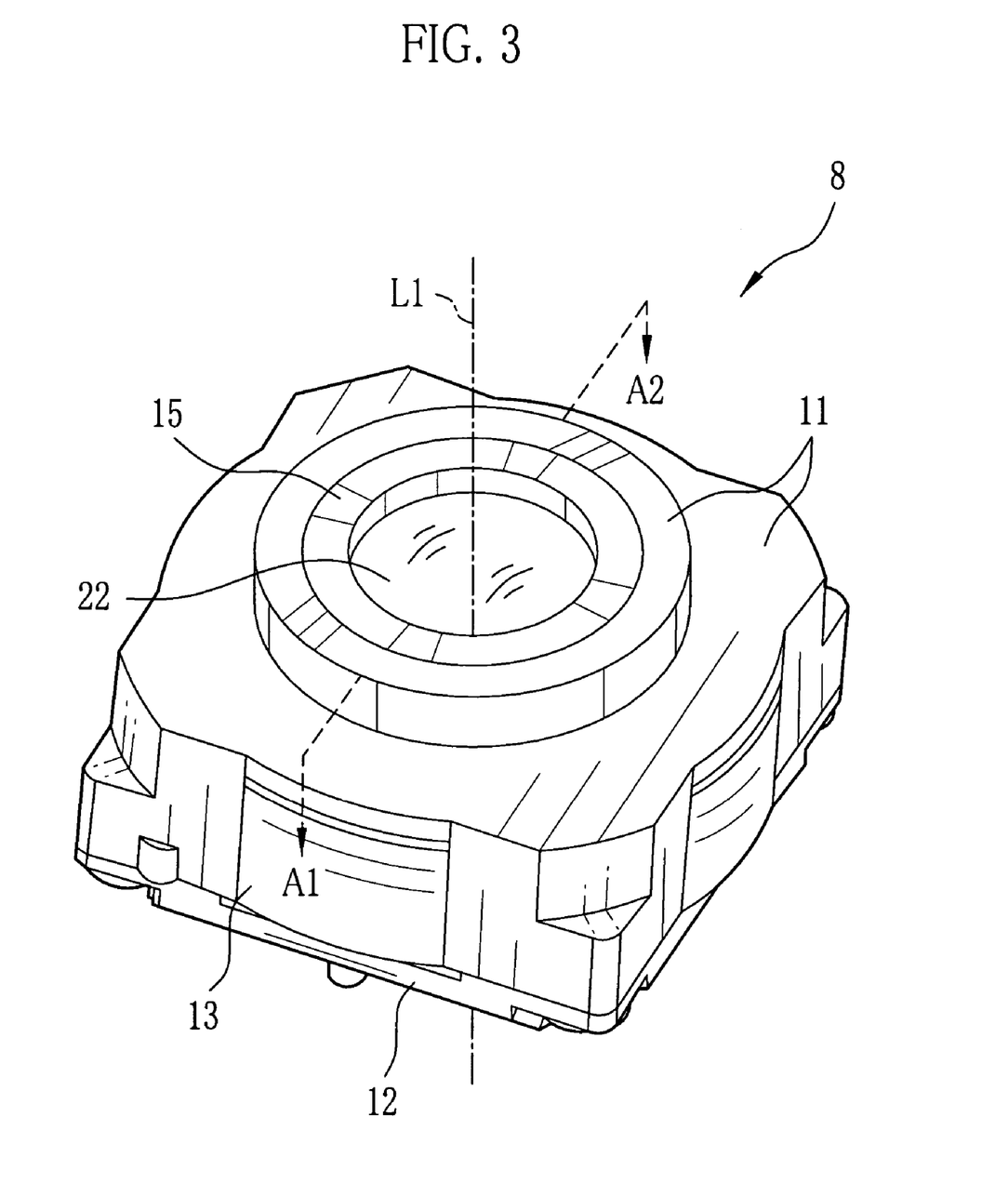
FIG. 3 is a perspective view of a lens device.

In FIG. 3, the lens device 8 is illustrated. The lens device 8 has a zooming function for moving plural lenses, which constitute the zoom lens system, back and forth along an optical axis L1 to perform a zooming of the object image. The lens device 8 is constituted by sandwiching a cylindrical stator 13 between upper and lower covers 11 and 12.

Figure 4:
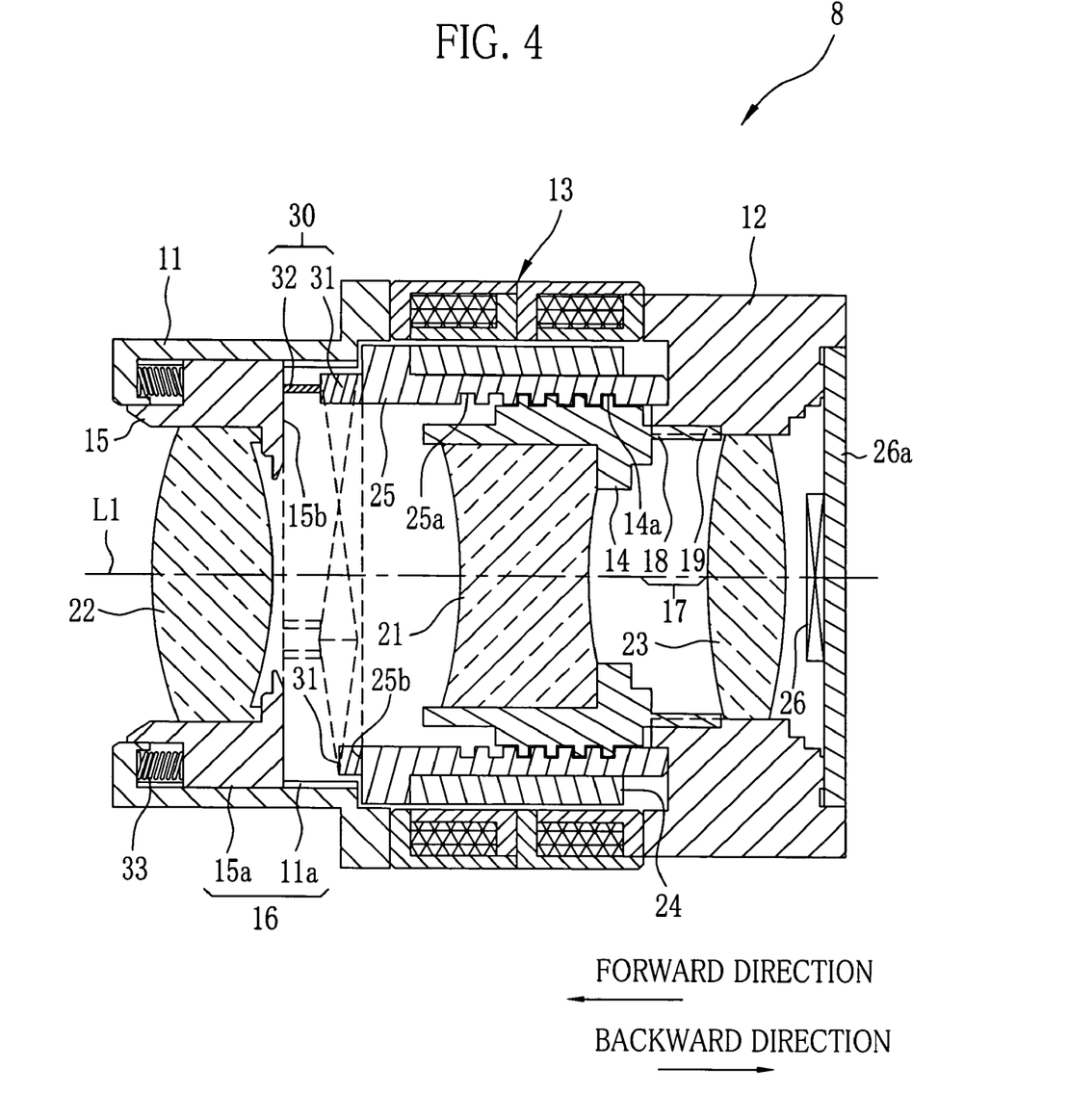
FIG. 4 is a cross-sectional view of the lens device along a line A1-A2 of FIG. 3, when a first lens holder is in a wide-angle position.

As shown in FIG. 4, the zoom lens system consisting of three lenses, which are a first lens 21 disposed in the middle, a second lens 22 disposed in front of (object side from) the first lens 21 and a third lens 23 disposed behind (image side from) the first lens 21. The lenses 21, 22 and 23 are incorporated inside a first lens holder 14, a second lens holder 15 and the lower cover 12 respectively. A rear end surface of the upper cover 11 is secured to the stator 13. A recessed portion 11a is provided in an inner periphery of the upper cover 11 along the optical axis. The second lens holder 15 has a protruding portion 15a on an outer periphery thereof. The recessed portion 11a and the protruding portion 15a constitute a first rotation stopper mechanism 16. The first rotation stopper mechanism 16 allows the second lens holder 15 to linearly move in the optical axial direction while preventing the second lens holder 15 from rotating around the optical axis L1, by fitting the protruding portion 15a of the second lens holder 15 into the recessed portion 11a provided in the upper cover 11.

A helicoid 14a, which engages an inner periphery of a rotary barrel 25 discussed later, is formed on an outer periphery of the first lens holder 14. On a rear end surface of the first lens holder 14 is provided a projection 18 which projects toward a backward direction. The projection 18 and a guide groove 19 provided on a front inner periphery of the lower cover 12 constitute a second rotation stopper mechanism 17. The second rotation stopper mechanism 17 allows the first lens holder 14 to linearly move in the optical axial direction while preventing the first lens holder 14 from rotating around the optical axis L1, by fitting the projection 18 of the first lens holder 14 into the guide groove 19 of the lower cover 12.

A front end surface of the lower cover 12 is secured to the stator 13. The lower cover 12 holds a CCD substrate 26a, on which the CCD image sensor 26 is fixed, behind the third lens 23. The CCD image sensor 26 obtains an object light, which has been transmitted through the first to third lenses 21 to 23 to form an optical image on a photoreceptive surface of the CCD image sensor 26, as an image pickup signal, thereby picking up the image. This CCD image sensor 26 is driven by a control unit 52 of the image pickup device 50 discussed later (see FIG. 8).

Figure 8:
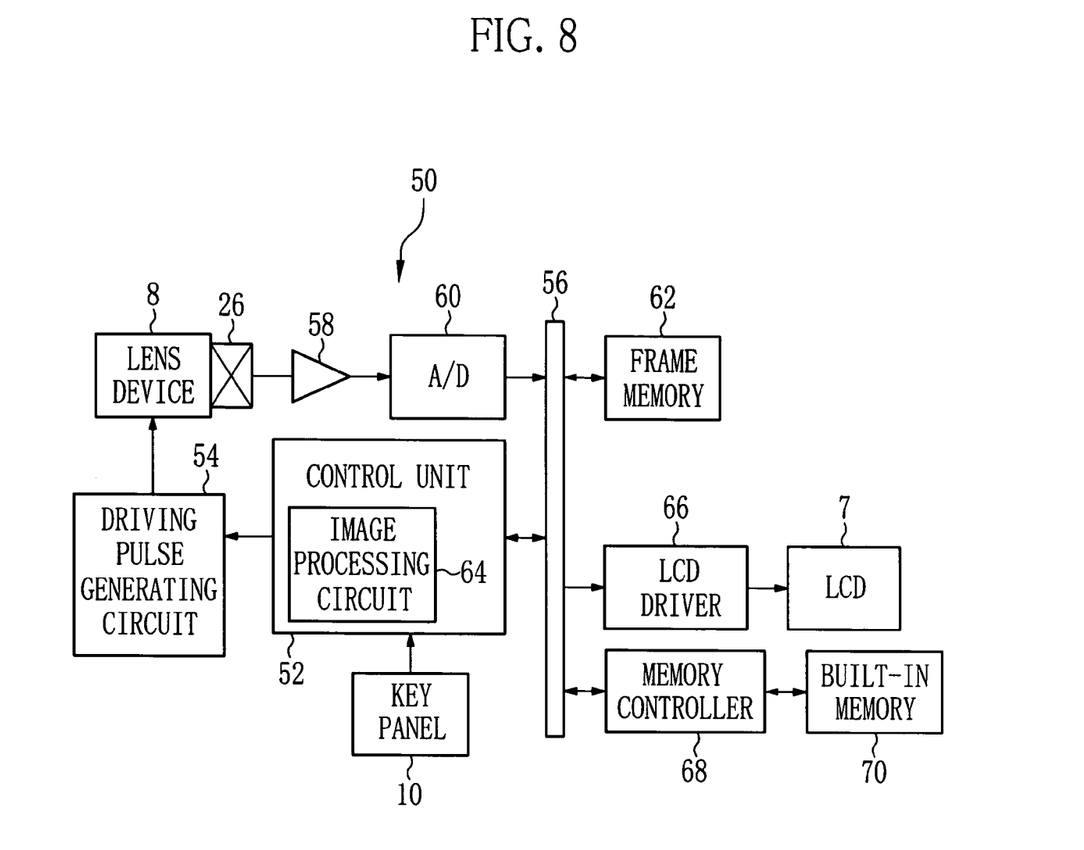
FIG. 8 is a block diagram illustrating an electronic structure of an image pickup device.

The stator 13 is controlled based on a pulse signal sent from a driving pulse generating circuit 54 (see FIG. 8). Inside the stator 13, a magnet (a hollow rotor) 24, a rotary barrel 25 and the first lens holder 14 are arranged in this order from the stator 13. The first lens holder 14, the magnet 24 and the rotary barrel 25 are each formed into a cylindrical shape and are arranged coaxially with the stator 13. The stator 13 and the magnet 24 constitute a claw-pole type stepping motor. When pulse current flows through the stator 13, the rotary barrel 25 rotates in accordance with the inputted driving pulse.

Figure 5:
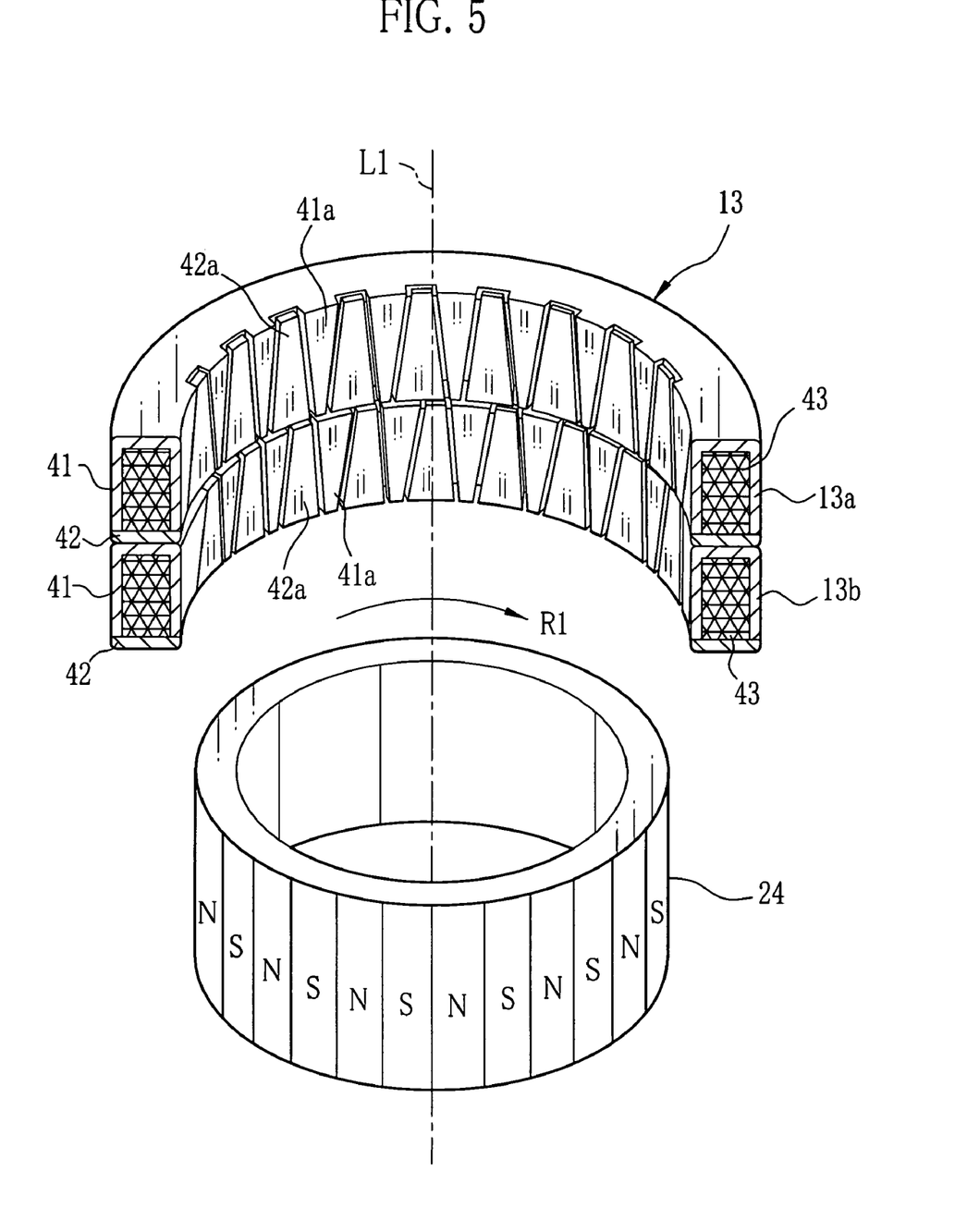
FIG. 5 is an explanatory view illustrating a composition of a hollow stepping motor.

In FIG. 5, the stator 13 is constituted of an upper coil portion 13a (object side) and a lower coil portion 13b (image side). The upper and lower coil portions 13a and 13b have same structure, therefore an explanation for the structure of the coil portion 13b is omitted here. The upper coil portion 13a is formed into a cylindrical shape and its coil 43 is surrounded with upper and lower covers 41 and 42. The coil 43 is formed by winding a conductive wire. The upper and lower covers 41 and 42 are respectively formed with teeth 41a and 42a on their inner peripheries, such that those teeth 41a and 42a mesh with each other. A gap is provided between each of the teeth 41a and 42a.

When pulse current flows through the coil 43 of the upper coil portion 13a and the coil 43 of the lower coil portion 13b alternately, magnetic lines of force are created in the coil 43. The created magnetic lines of force are led toward the inside of the stator 13 by the upper cover 41 or the lower cover 42. When the magnetic lines of force reach the teeth 41a or the teeth 42a, the magnetic lines of force are once released into the air, and cross the gap between the teeth 41a and 42a. In this way, either of the teeth 41a or 42a, which are arranged to mesh with each other, become north poles and the other become south poles, thereby forming magnetic fields of the north and south poles alternately along an inner periphery of the stator 13.

The magnet 24 as a permanent magnet is magnetized with, for instance, forty eight poles. Each of the upper and lower coil portions 13a and 13b is provided with forty eight teeth in accordance with the number of the magnetized poles. The teeth 41a and 42a of the upper coil portion 13a and the teeth 41a and 42a of the lower coil portion 13b are offset from each other by half a tooth pitch. The magnet 24 rotates inside the stator 13 due to the forces of repulsion and attraction between the magnet 24 and the magnetic fields created by the stator 13.

When pulse current flows through the stator 13, the magnet 24 rotates by one pole as one step. Therefore, the magnet 24 rotates entirely around with forty eight steps. When clockwise direction R1 is defined as a forward direction of the rotational direction of the magnet 24, the current is passed through the upper coil portion 13a in the forward direction, through the lower coil portion 13b in the forward direction, through the upper coil portion 13a in the reverse direction, and then through the lower coil portion 13b in the reverse direction, in order to rotate the magnet 24 in the forward direction. The current should be repeatedly passed in this order to keep the magnet 24 rotating in the forward direction. On the other hand, the current is passed through the upper coil portion 13a in the forward direction, through the lower coil portion 13b in the reverse direction, through the upper coil portion 13a in the reverse direction, and then through the lower coil portion 13b in the forward direction, in order to rotate the magnet 24 in the reverse direction. The current should be repeatedly passed in this order to keep the magnet 24 rotating in the reverse direction. In the lens device 8, the first lens holder 14 moves in the forward direction when the pulse current of the forward direction is passed through the stator 13.

The rotary barrel 25 is fixed inside the magnet 24, as shown in FIG. 4. A helicoid 25a is formed on the inner periphery of the rotary barrel 25, and this helicoid 25a engages the helicoid 14a formed on the outer periphery of the first lens holder 14. When the pulse current flows through the stator 13, the rotary barrel 25 rotates in cooperation with rotation of the magnet 24. The rotation power of the rotary barrel 25 is converted to linear power in the optical axial direction by the helicoids 14a and 25a. When the linear power in the optical axial direction is transmitted to the first lens holder 14, the first lens holder 14 is moved linearly in the optical axial direction. In the lens device 8, the first lens holder 14 moves a full stroke from a frontmost end to a rearmost end of the helicoid 25a of the rotary barrel 25 when the rotary barrel 25 rotates one-third of a turn (120 degrees).

According to the present embodiment, the lens device 8 is provided with a cam mechanism 30 that moves the second lens holder 15 in the optical axial direction at the same time when the first lens holder 14 is moved in the optical axial direction in cooperation with the rotation of the rotary barrel 25. The cam mechanism 30 is constituted of a cam portion 31 that is disposed on a front end surface 25b of the rotary barrel 25 and cam followers 32 that are disposed on a rear end surface 15b of the second lens holder 15. This configuration does not make the external size of the lens device 8 large, thereby contributing to the miniaturization of the lens device 8. A spring (a biasing member) 33 as a supporting member of the cam mechanism 30 is secured to the front end surface of the second lens holder 15, thereby biasing the second lens holder 15 in the backward direction.

Figure 6:
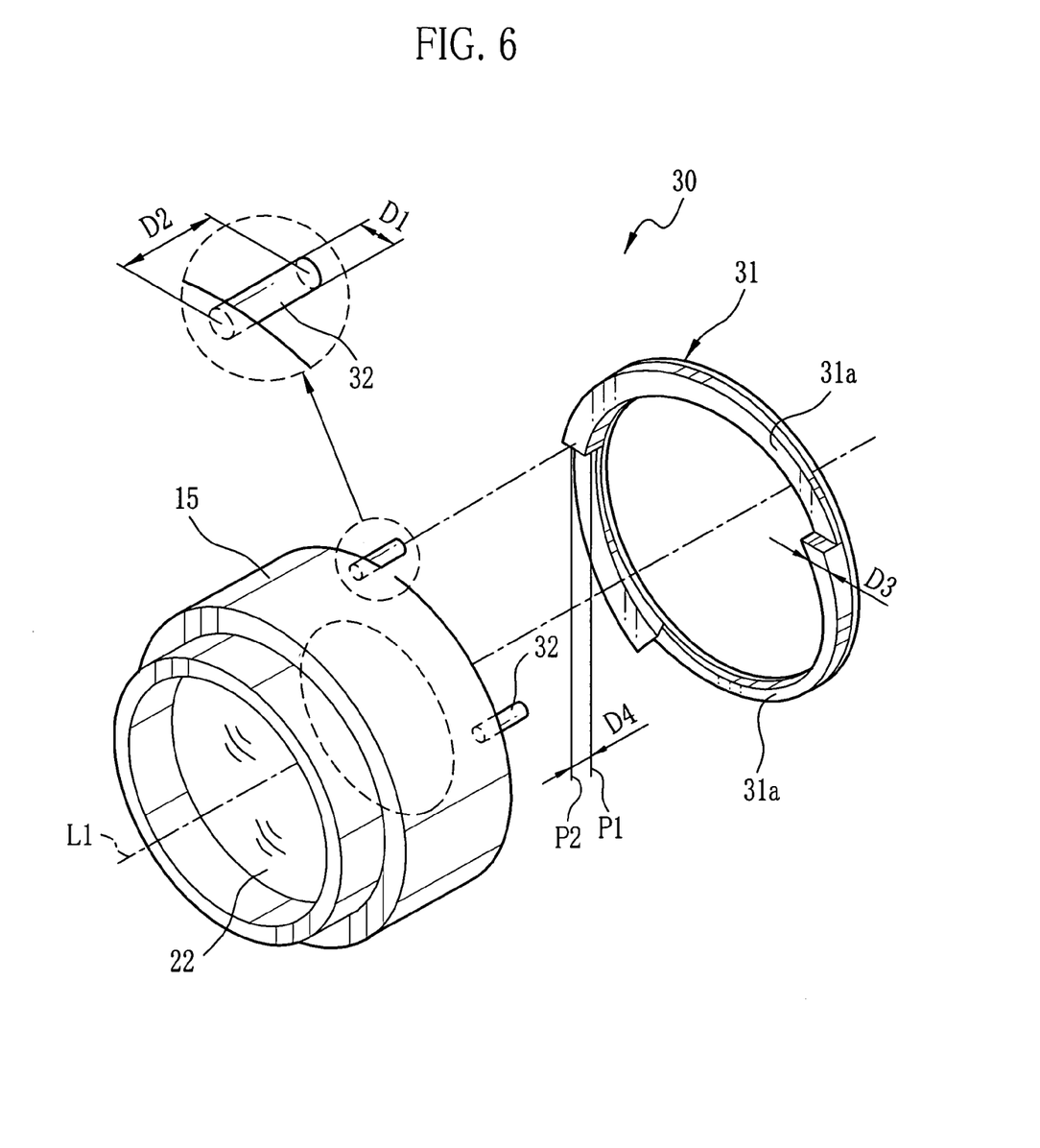
FIG. 6 is an explanatory view illustrating a composition of a cam mechanism.

The cam portion 31 has a ring shape arranged on the optical axis L1, as shown in FIG. 6. A rear end surface of the cam portion 31 is secured to the front end surface 25b of the rotary barrel 25, and a front end surface of the cam portion 31 is formed to have sloped surfaces 31a inclined along the circumferential direction. The front end surface of the cam portion 31 is evenly split into three parts with the optical axis L1 as a center, and each of them is provided with the sloped surface 31a. The angle of inclination of each sloped surface 31a is predetermined in accordance with the interaction among the first to third lenses 21 to 23. The three cam followers 32 having a cylindrical pin form are secured to the rear end surface 15b of the second lens holder 15. A diameter D1 of each of the cam followers 32 is smaller than a width D3 of each of the sloped surfaces 31a of the cam portion 31. Additionally, a length D2 in the axial direction of each of the cam followers 32 is larger than a height D4 of each of the sloped surfaces 31a, which is the distance from a lowest point P1 to a highest point P2 of each of the sloped surfaces 31a along the optical axial direction. The spring 33 is secured to the upper cover 11 at its one end and to the front end surface of the protruding portion 15a of the second lens holder 15 at the other end. The second lens holder 15 is biased toward the cam portion 31 due to elasticity of the spring 33. Therefore, each of the three cam followers 32 is always in contact with the respective sloped surface 31a. When the cam portion 31 rotates along with the rotary barrel 25, the cam followers 32 shift in the optical axial direction along the sloped surfaces 31a. Thereby, the second lens holder 15 is moved linearly in the optical axial direction.

Figure 7:
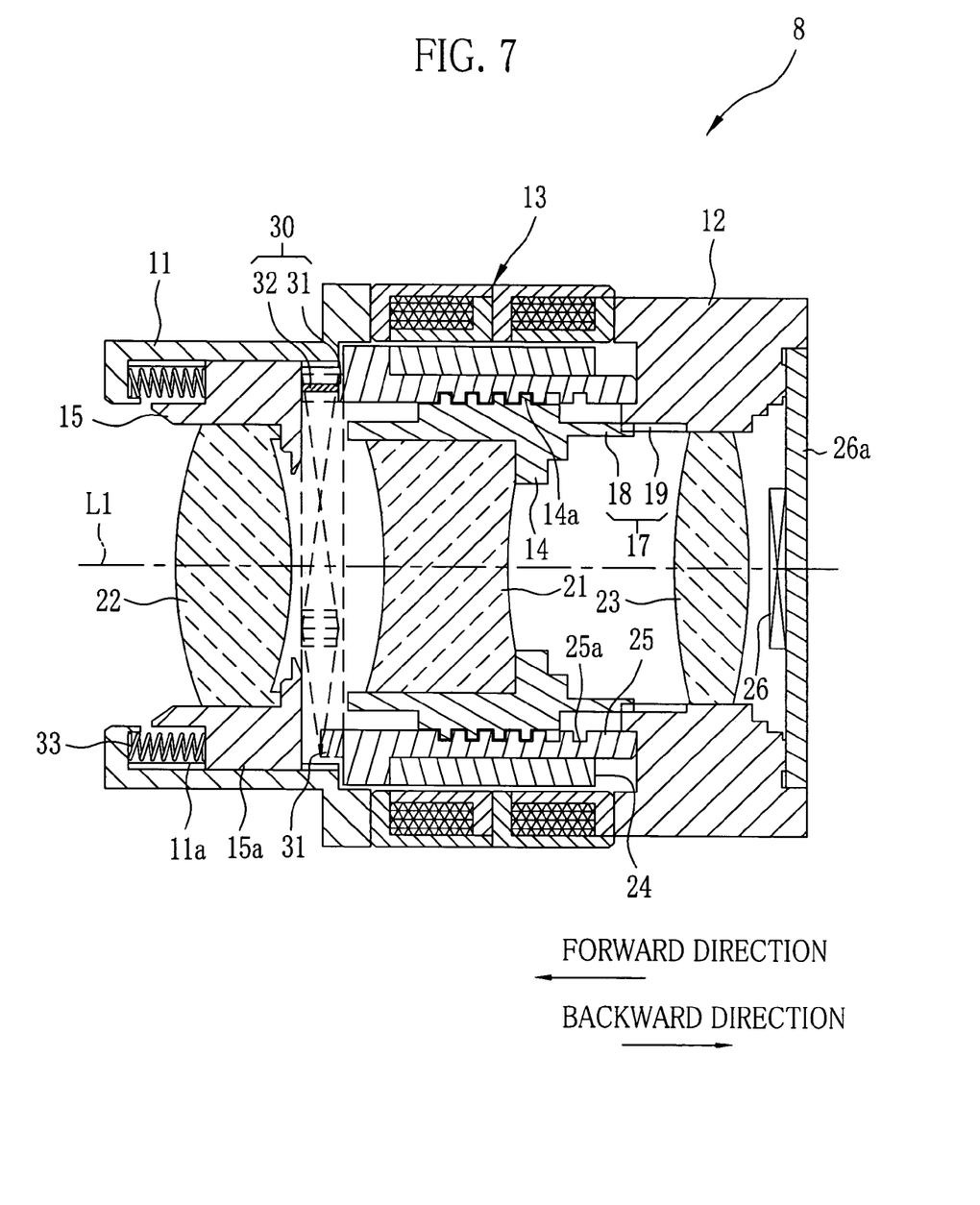
FIG. 7 is a cross-sectional view of the lens device when the first lens holder is in a telephoto position.

Now the movement of the second lens holder 15 in the axial direction will be explained. The rotation power of the rotary barrel 25 is transmitted to the first lens holder 14 by the helicoids 14a and 25a. At the same time, the rotation power of the rotary barrel 25 is converted to the linear power in the optical axial direction by the cam portion 31 and the cam followers 32, and is transmitted to the second lens holder 15. Through the transmission of the linear power in the optical axial direction, the second lens holder 15 moves in the optical axial direction with being guided by the first rotation stopper mechanism 16. In the lens device 8, the highest points P2 (see FIG. 6) of the sloped surfaces 31a come in contact with the cam followers 32 when the first lens holder 14 is moved to the rearmost position, that is, a wide-angle position, in cooperation with the rotation of the rotary barrel 25, as shown in FIG. 4. The lowest points P1 (see FIG. 6) of the sloped surfaces 31a come in contact with the cam followers 32 when the first lens holder 14 is moved to the front end position, that is, a telephoto position, in cooperation with the rotation of the rotary barrel 25 for making one-third of a turn, as shown in FIG. 7, from the position as shown in FIG. 4. Therefore, the second lens holder 15 is movable in the axial direction within the range of the height D4 of the sloped surfaces 31a along the optical axial direction.

As shown in FIG. 8, the image pickup device 50 having the above-described lens device comprises the control unit 52, which is a microcomputer, for controlling over every part of the image pickup device 50. The control unit 52 is connected to every part of the image pickup device 50 through a data bus 56, and controls every part of the image pickup device 50 according to operation inputted from the key panel 10.

The control unit 52 obtains the image pickup signal by driving the CCD image sensor 26 when the cellular phone 1 is switched to the still image pickup mode. The image pickup signal, which is sequentially outputted from the CCD image sensor 26, is amplified to an appropriate level by a variable gain preamplifier 58, and then converted into image data in a digital form by an A/D converter 60. The image data obtained in this way is sequentially written in a frame memory 62. The frame memory 62 is a work memory for an image processing circuit 64, which is provided in the control unit 52, to temporarily store the image data in order to perform various image processing procedures on the image data.

The image processing circuit 64 performs well-known image processing procedures, such as gamma correction, white balance correction, image quality correction, and so forth, on the image data written in the frame memory 62. The image data being processed by the image processing circuit 64 is displayed as a through image on the LCD 7 through a LCD driver 66, or is written in a built-in memory 70 through a memory controller 68.

The control unit 52 is connected to the driving pulse generating circuit 54 that drives the stator 13. When the selection key 10c is depressed in the still image pickup mode, the control unit 52 is actuated to adjust the pulse current being supplied to the stator 13, thereby controlling the rotation of the rotary barely 25. When the rotary barrel 25 rotates, the first and second lens holders 14 and 15 are moved, thus allowing varying a zooming level of the taking lens.

Hereinafter, the present invention, in which the above configuration is applied to, is explained. In picking up a still image with the cellular phone 1, framing can be performed with confirming the through image of the object displayed on the LCD 7, after the still image pickup mode is selected. After framing, the still image can be picked up by operating the enter key 10d.

During framing, zooming can be performed by operating the selection key 10c. The first lens holder 14 is in the wide-angle position (rearmost end position), which is a standard position for the first lens holder 14, before zooming. When the selection key 10c is depressed at the top, the rotary barrel 25 rotates and the first lens holder 14 moves toward the telephoto position (frontmost end position). At the same time, the cam portion 31 rotates in cooperation with the rotation of the rotary barrel 25, and the cam followers 32 shift in the backward direction along the sloped surfaces 31a of the cam portion 31, thereby moving the second lens holder 15 in the backward direction. With the selection key 10c being kept depressed at the top, the cam followers 32 come to contact with the lowest points P1 of the sloped surfaces 31a when the first lens holder 14 reaches the telephoto position, thereby stopping the movement of the second lens holder 15 in the backward direction.

On the other hand, when the selection key 10c is depressed at the bottom, the rotary barrel 25 rotates and the first lens holder 14 moves toward the wide-angle position. At the same time, the cam followers 32 shift in the forward direction along the sloped surfaces 31a of the cam portion 31, thereby moving the second lens holder 15 in the forward direction. With the selection key 10c being kept depressed at the bottom, the cam followers 32 come to contact with the highest points P2 of the sloped surfaces 31a when the first lens holder 14 reaches the wide-angle position, thereby stopping the movement of the second lens holder 15 in the forward direction.

In the cellular phone 1 of the present invention, only one motor is necessary for moving two lenses because these two lenses can be moved by rotating one rotary barrel. Therefore, the lens device according to the present invention can be miniaturized while being manufactured at a low cost as compared to the conventional lens devices which move two lenses by use of two motors. Additionally, the lens device can be formed to have a relatively small external size because the cam mechanism for moving the second lens is disposed between the end surfaces of the second lens holder and the rotary barrel, which are opposing each other.

Figure 9:
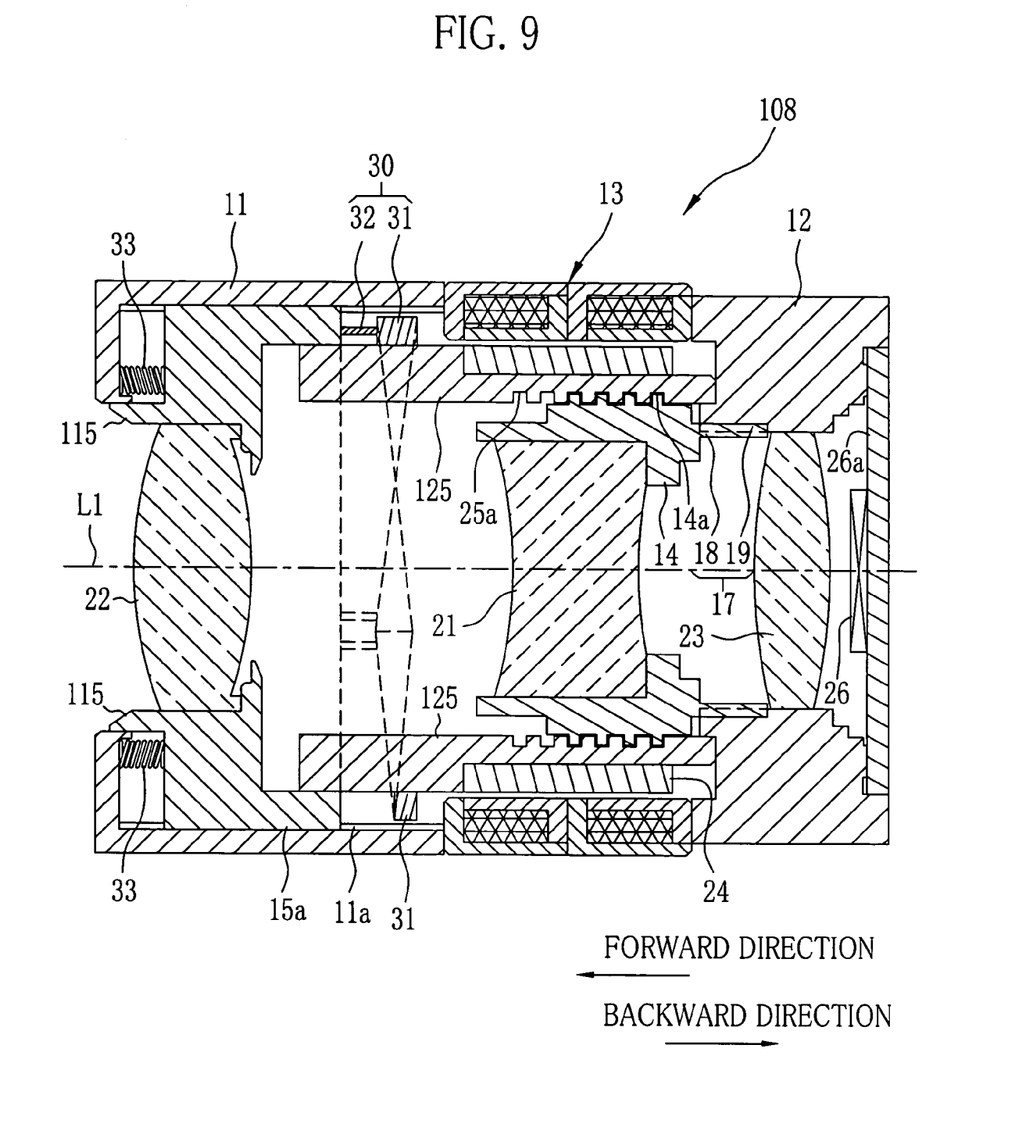
FIG. 9 is a cross-sectional view of a lens device of another embodiment.
Figure 10:
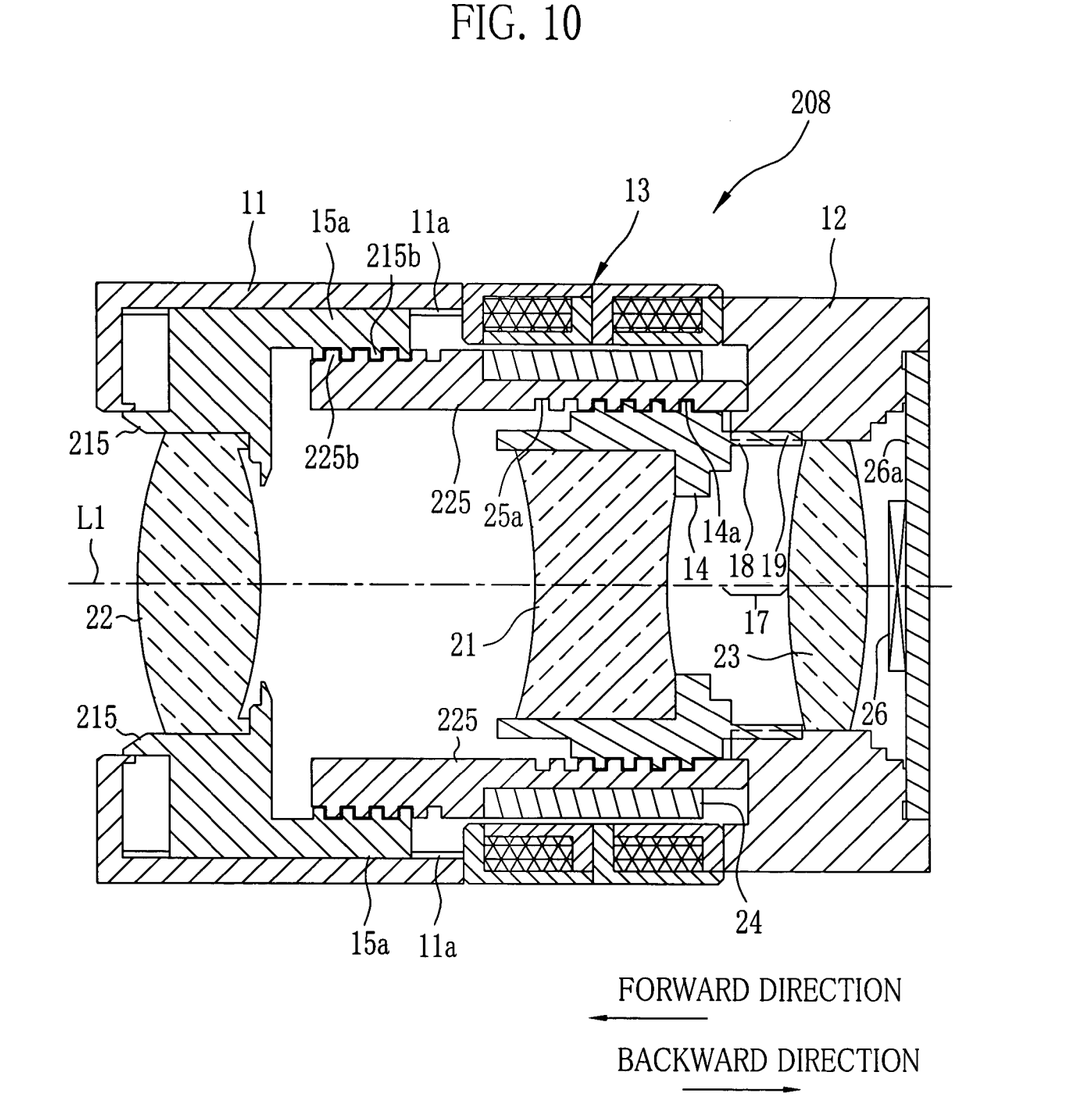
FIG. 10 is a cross-sectional view of a lens device of further another embodiment.

In the above embodiment, although the cam mechanism for moving the second lens is disposed between the end surfaces of the second lens holder and the rotary barrel, which are opposing each other, the present invention is not limited to this. For instance, it is possible to dispose a cam portion 31 around an outer periphery of a rotary barrel 125, while cam followers 32 are disposed on an rear end surface of a second lens holder 115, which is formed to have a diameter that is larger than that of the rotary barrel 125, as shown in a lens device 108 of FIG. 9. Although the lens device according to the present embodiment (second embodiment) may be larger than the lens device of the above embodiment (first embodiment), it still can be miniaturized while being manufactured at a low cost as compared to the conventional lens devices having two motors, since the lens device of the present embodiment uses one motor for moving two lenses. It is to be noted that the same or like elements will be designated by the same reference numerals as in the above embodiment, so the following description will refer only to those elements which are essential to the embodiments shown in FIGS. 9 and 10.

In the above embodiments, although the second lens is moved by the cam mechanism, the present invention is not limited to this. For instance, it is possible to connect a rotary barrel 225 and a second lens holder 215 through a helicoid mechanism, as shown in a lens device 208 of FIG. 10. According to the present embodiment (third embodiment), the second lens holder 215 is formed to have a diameter that is larger than that of the rotary barrel 225, and a helicoid 225b formed on an outer periphery of the rotary barrel 225 and a helicoid 215b formed on an inner periphery of the second lens holder 215 are engaged with each other. Although the lens device according to the present embodiment may be also larger than the lens device of the first embodiment, it still can be miniaturized while being manufactured at a low cost as compared to the conventional lens devices having two motors, since the lens device of the present embodiment uses one motor for moving two lenses.

In the above embodiments, the zoom lens system is constituted of three lenses. However it is possible to constitute the zoom lens only with the first and second lenses. Additionally, in the above embodiments, three cam followers and three sloped surfaces are provided to prevent the second lens holder from inclining against the optical axial direction. However, the number of sloped surfaces and cam followers can be designated as appropriate.

Moreover, in the above embodiments, the cam portion is disposed on the rotary barrel and the cam followers are disposed on the second lens holder. However, the arrangement of the cam mechanism can be changed such that the cam portion is disposed on the second lens holder and the cam followers are disposed on the rotary barrel. The present invention with this configuration produces the same effect as obtained from the above embodiments.

In the above embodiments, the present invention is applied for the image pickup device (digital camera), which has the CCD image sensor. However, the present invention can be widely applied for silver halide film cameras, which use photo films or photosensitive plates, and the like.

Moreover, the present invention can be applied for image projecting devices including projectors, or for pickup lenses, which are used for reading data on optical media, such as CD-ROM or DVD.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens device comprising:
    a motor having a stator for creating a magnetic field according to energization and a hollow rotor disposed inside said stator, said hollow rotor rotating in said magnetic field created by said stator,
    a rotary barrel fixed on an inner periphery of said rotor;
    a first lens holder for holding a first lens;
    a first interconnection mechanism for connecting said first lens holder and said rotary barrel to move said first lens holder along an optical axis in cooperation with rotation of said rotary barrel, said optical axis having a direction;
    a second lens holder, located at an object-side from said first lens holder, for holding a second lens; and
    a second interconnection mechanism for connecting said second lens holder and said rotary barrel to move said second lens holder along said optical axis in cooperation with rotation of said rotary barrel,
    wherein
    said second interconnection mechanism is constituted of a cam mechanism comprising a cam portion, having a sloped surface inclined along a rotational direction of said rotary barrel, and a cam follower contacting said sloped surface of said cam portion,
    either of said second lens holder or said rotary barrel is provided with said cam portion and the other is provided with said cam follower,
    said second lens holder is moved according to shifting of a contact position between said sloped surface of said cam portion and said cam follower in cooperation with rotation of said rotary barrel, and
    said cam follower protrudes along said direction of said optical axis.

2. A lens device as defined in claim 1, wherein said first interconnection mechanism comprises a helicoid formed on an inner periphery of said rotary barrel and a helicoid formed on an outer periphery of said first lens holder being engaged with each other.

3. A lens device as defined in claim 2, wherein said second interconnection mechanism comprises a helicoid formed on an outer periphery of said rotary barrel and a helicoid formed on an inner periphery of said second lens holder being engaged with each other.

4. A lens device as defined in claim 1, wherein either of said cam portion or said cam follower is disposed on an image-side end surface of said second lens holder and the other is disposed on an object-side end surface of said rotary barrel.

5. A lens device as defined in claim 1, wherein said cam portion is provided on an outer periphery of said rotary barrel, whereas said cam follower is provided on said image-side end surface of said second lens holder.

6. A lens device as defined in claim 1, wherein said motor is a stepping motor.

* * * * *